(12) United States Patent
Gottschalk

(10) Patent No.: US 11,643,140 B2
(45) Date of Patent: May 9, 2023

(54) STEERABLE VEHICLE SUSPENSION WITH PNEUMATIC RETRACTORS

(71) Applicant: WATSON & CHALIN MANUFACTURING, INC., McKinney, TX (US)

(72) Inventor: Michael Gottschalk, Romeoville, IL (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 1049 days.

(21) Appl. No.: 16/278,002

(22) Filed: Feb. 15, 2019

(65) Prior Publication Data

US 2019/0315402 A1    Oct. 17, 2019

(51) Int. Cl.
*B62D 7/22* (2006.01)
*B62D 9/00* (2006.01)
*B62D 7/20* (2006.01)
*B62D 7/18* (2006.01)
*B60G 11/27* (2006.01)

(52) U.S. Cl.
CPC .............. *B62D 9/00* (2013.01); *B62D 7/18* (2013.01); *B62D 7/20* (2013.01); *B60G 11/27* (2013.01); *B60Y 2200/1422* (2013.01)

(58) Field of Classification Search
CPC ... B62D 9/00; B62D 7/18; B62D 7/20; B62D 7/144; B62D 7/228; B60G 11/27; B60G 17/04; B60G 2400/60; B60G 2200/445; B60G 2500/22; B60G 2300/02; B60Y 2200/1422
USPC ........................................................ 280/408
See application file for complete search history.

(56) References Cited

U.S. PATENT DOCUMENTS

| | | | |
|---|---|---|---|
| 4,534,575 A * | 8/1985 | Grove | B60G 21/026 180/41 |
| 5,282,644 A | 2/1994 | Larson | |
| 5,447,321 A * | 9/1995 | Hurlburt | B62D 9/00 280/93.505 |
| 5,620,194 A * | 4/1997 | Keeler | B62D 7/144 280/81.6 |

(Continued)

OTHER PUBLICATIONS

European Search Report dated Nov. 10, 2021 for EP Patent Application No. 18915263.0, 12 pages.

(Continued)

*Primary Examiner* — Toan C To
(74) *Attorney, Agent, or Firm* — Smith IP Services, PC

(57) ABSTRACT

A steerable vehicle suspension can include an axle, at least one retractor having a length that decreases in response to a pressure increase applied to the retractor, and at least one wheel spindle. Resistance to rotation of the wheel spindle relative to the axle increases in response to the pressure increase applied to the retractor. A method of operating a steerable vehicle suspension of a vehicle can include allowing steering knuckles rotatably mounted at opposite ends of an axle to rotate relative to the axle while the vehicle moves forward, and applying an inwardly directed force simultaneously to each of the steering knuckles. Another steerable vehicle suspension can include two rotatably mounted steering knuckles, and two retractors connected to the steering knuckles. An inwardly directed force is applied by each retractor to a respective one of the steering knuckles in response to pressure applied to the retractors.

55 Claims, 12 Drawing Sheets

(56) References Cited

U.S. PATENT DOCUMENTS

| | | | | |
|---|---|---|---|---|
| 5,823,288 | A * | 10/1998 | Buff, IV | G09B 9/042 |
| | | | | 180/413 |
| 6,418,856 | B2 * | 7/2002 | Hossfield | B62D 1/265 |
| | | | | 104/246 |
| 6,439,586 | B1 | 8/2002 | Eckelberry | |
| 8,517,394 | B2 * | 8/2013 | Pfiffner | B62D 9/00 |
| | | | | 280/5.514 |
| 8,596,659 | B2 | 12/2013 | Hudson | |
| 9,561,819 | B2 * | 2/2017 | Tuttle | B60G 17/0162 |
| 2012/0091678 | A1 | 4/2012 | Buttner et al. | |
| 2012/0274040 | A1 | 11/2012 | Hudson | |
| 2015/0175195 | A1 * | 6/2015 | Tuttle | B60G 17/0195 |
| | | | | 701/41 |
| 2015/0175203 | A1 | 6/2015 | Suh et al. | |
| 2016/0227698 | A1 * | 8/2016 | Ballu | B62D 7/1509 |
| 2019/0210646 | A1 * | 7/2019 | Shepherd | F16F 1/041 |

OTHER PUBLICATIONS

Canadian Examiner's Report dated Nov. 5, 2021 for CA Patent Application No. 3,096,608, 3 pages.
Canadian Examiner's Report dated Apr. 4, 2022 for CA Patent Application No. 3,096,608, 3 pages.
International Search Report with Written Opinion dated Sep. 27, 2018 for PCT Patent Application No. PCT/US2018/027703, 21 pages.
Indian Examination Report dated Apr. 27, 2022 for IN Patent Application No. 202017044686, 6 pages.

* cited by examiner

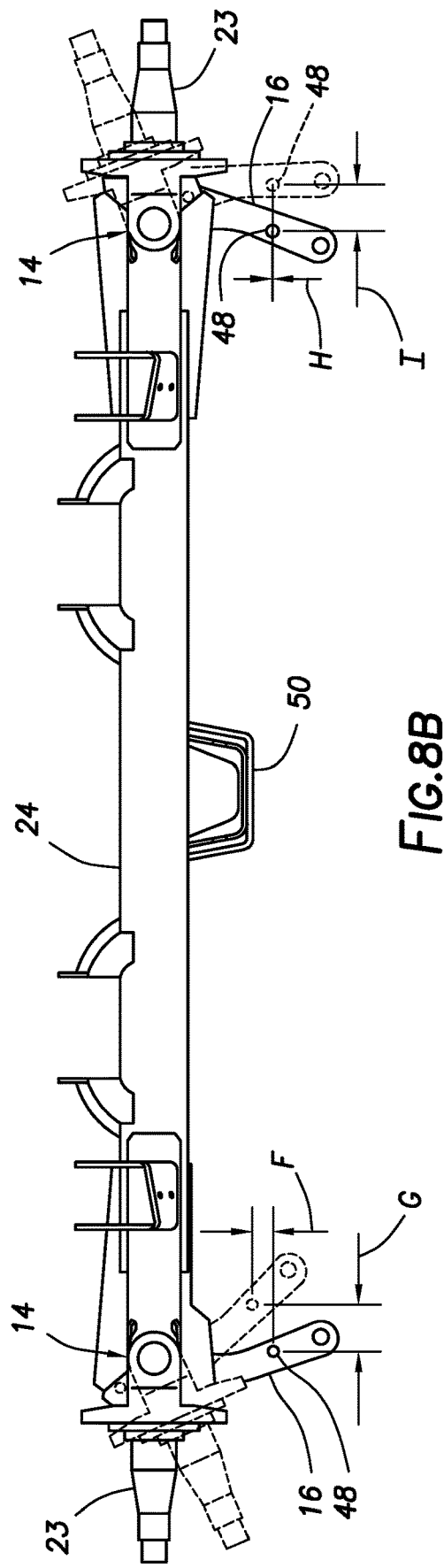

STEERABLE VEHICLE SUSPENSION WITH PNEUMATIC RETRACTORS

CROSS-REFERENCE TO RELATED APPLICATION

This application claims priority under 35 USC § 119 to International Application No. PCT/US18/27703 filed on 16 Apr. 2018. The entire disclosure of this prior application is incorporated herein by this reference.

BACKGROUND

This disclosure relates generally to vehicle suspension systems and, in one example described below, more particularly provides a steerable vehicle suspension with pneumatic retractors.

Steerable vehicle suspensions may be used in a wide variety of different applications. For example, a steerable lift axle suspension may be used to enable a commercial vehicle to comply with bridge laws. Typically, in such situations, the steerable vehicle suspension is steerable when the vehicle is moving forward, but steering should be prevented when the vehicle is moving in reverse (e.g., backing up).

Therefore, it will be readily appreciated that improvements are continually needed in the arts of designing and utilizing steerable vehicle suspensions. Such improvements may provide for steering when a vehicle is moving forward, and prevention of steering when the vehicle is backing up.

DETAILED DESCRIPTION

Figure 1:
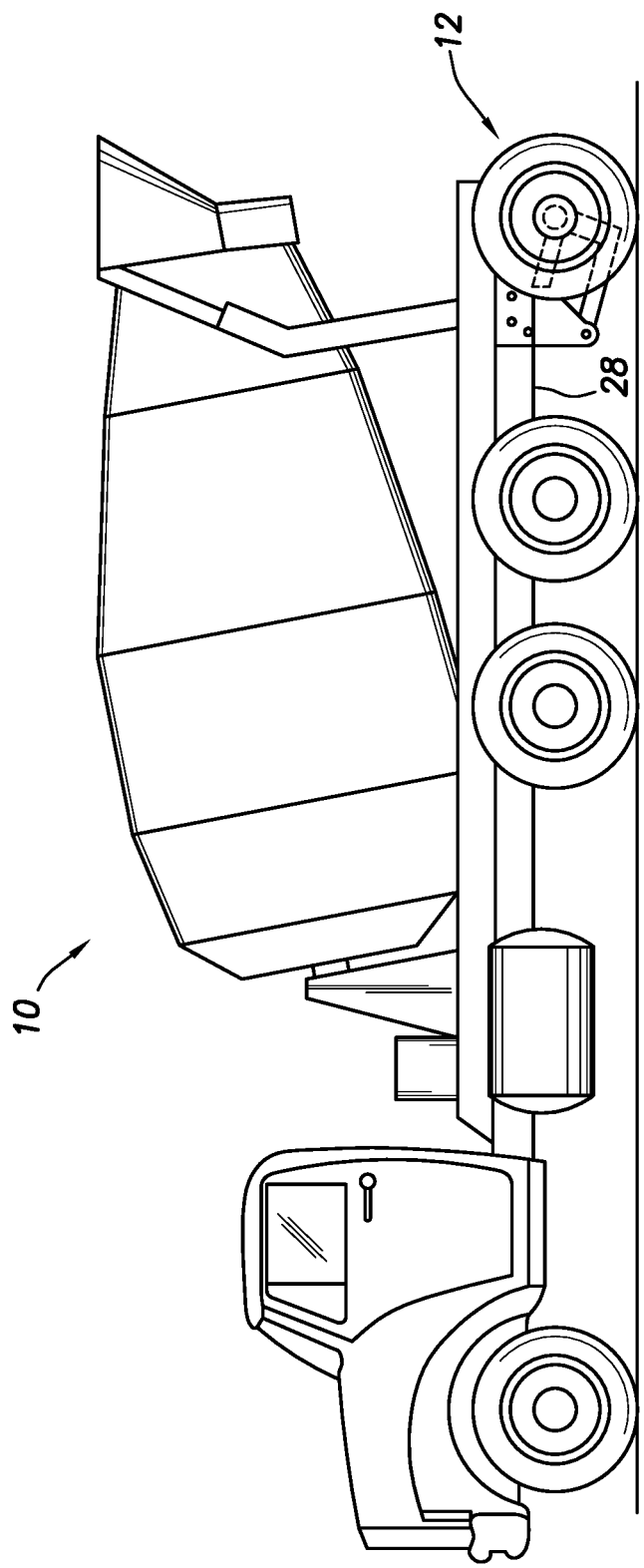
FIG. 1 is a representative partially cross-sectional view of an example of a vehicle which can embody principles of this disclosure.

Representatively illustrated in FIG. 1 is a vehicle 10 which can incorporate a steerable suspension 12 and associated method that can embody principles of this disclosure. It is to be understood that the steerable suspension 12 can be utilized in other vehicles (such as, a motor coach, a dump truck, heavy-duty all-terrain vehicles, etc.). The vehicle 10 is merely a representative example of a vehicle in which the suspension 12 may be used. Therefore, it should be understood that the steerable suspension 12 is not restricted to the example depicted in FIG. 1.

Figure 2:
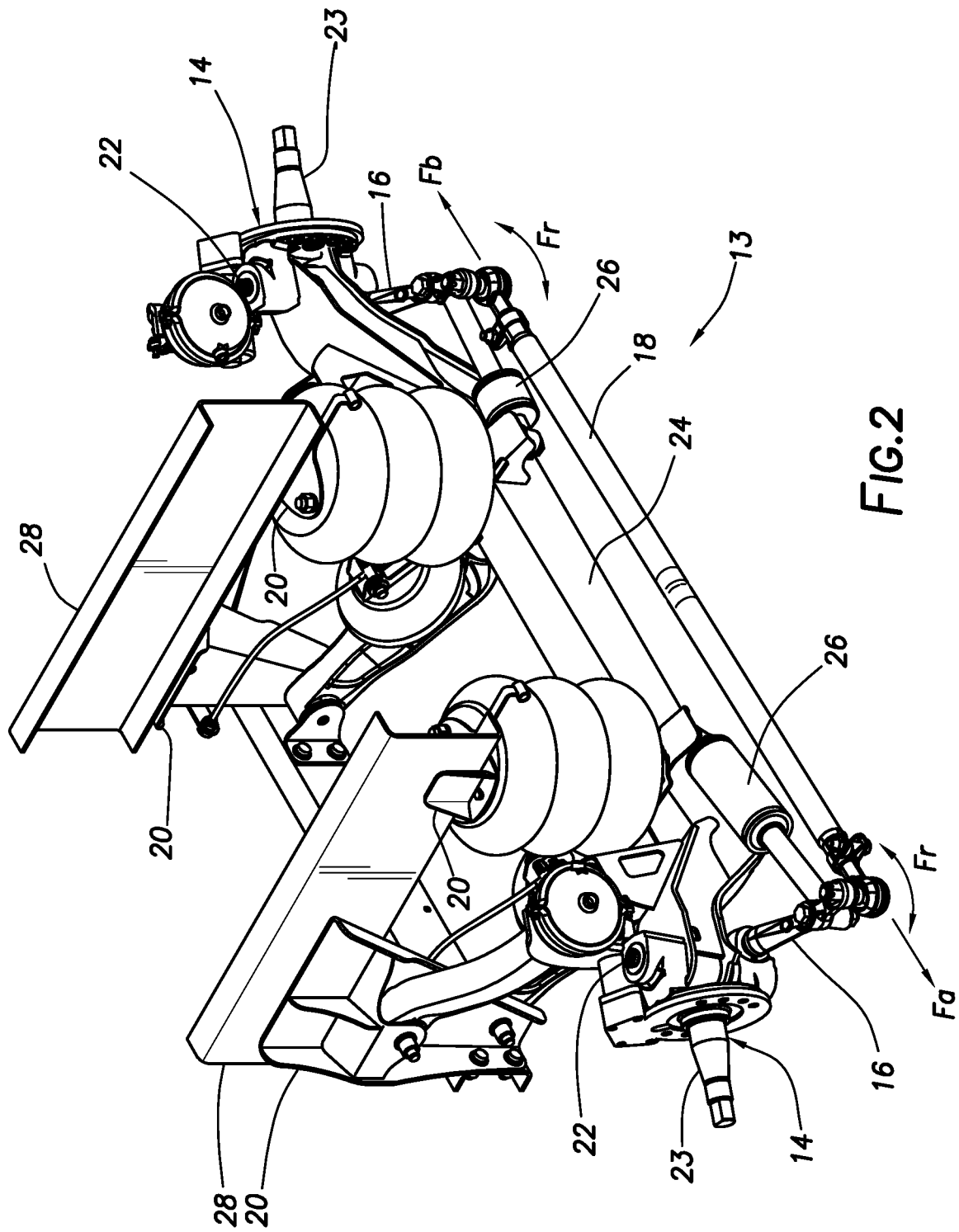
FIG. 2 is a representative perspective view of an example of a steerable vehicle suspension.

Referring additionally now to FIG. 2, an example of a steerable suspension 13, which can benefit from the principles of this disclosure, is representatively illustrated. The suspension 13 includes brackets 20 for securing the suspension 13 to a frame 28 of the vehicle 10 (see FIG. 1).

The suspension 13 includes steering knuckles 14 pivotably attached at opposite ends of an axle 24 by respective king pins 22. Wheel spindles 23 extend laterally outward from the steering knuckles 14, for rotatably mounting wheels at opposite ends of the axle 24. Tie rod arms 16 are rigidly attached to their respective steering knuckles 14 and extend outward relative to the king pins 22.

In some examples, a steering knuckle 14 may be a single integrated component (e.g., with the spindle 23, tie rod arm 16, brake mount, etc., being integral parts of the steering knuckle 14). In other examples, the spindle 23, tie rod arm 16 and/or brake mount, etc. may be separate components, but still considered part of the steering knuckle 14 assembly.

A tie rod 18 is pivotably attached to the tie rod arms 16 and extends across the steerable suspension 13 generally parallel to the axle 24. The tie rod 18 links the steering knuckles 14, so that they rotate together.

Dampers 26 are interconnected between the respective tie rod arms 16 and the axle 24. The dampers 26 apply a stabilization force to the tie rod arms 16. The stabilization force resists movement of the tie rod arms 16 and, therefore, resists rotation of the respective steering knuckles 14.

The dampers 26 may apply a stabilization force to the steering knuckles 14 to resist rotation of the steering knuckles. The stabilization force is varied in this example similar to the manner in which a shock absorber functions (e.g., with the force varying in relation to a speed of compression or extension).

Unfortunately, the dampers 26 are subjected to large compressive loads when a turning speed of the knuckles 14 is increased, and even larger dynamic compressive loads in operation. Thus, the dampers 26 can fail due to overloading in compression (for example, buckling of a damper piston rod) or leaking.

The leaking can be due to road debris kicked up by tires of a vehicle, since the debris can strike and damage the piston rods of the dampers 26 (the damaged piston rods cause seals engaging the piston rods to leak). Pneumatic retractors described below are not subject to such damage, because they do not have exposed piston rods, but instead comprise durable materials (similar in some cases to road-proven air spring material) that are not damaged by kicked-up road debris.

Figure 3:
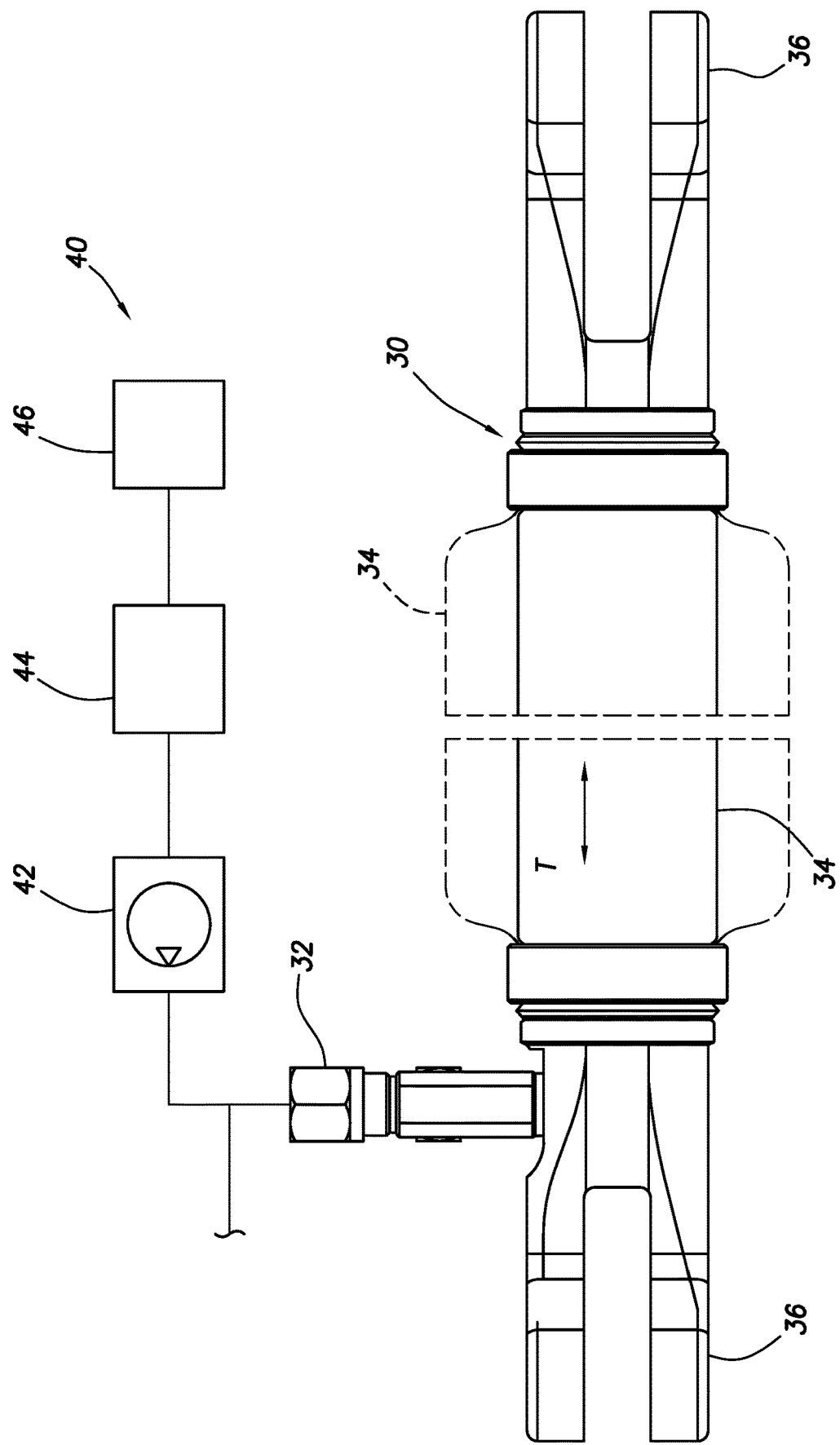
FIG. 3 is a representative elevational view of a retractor and control system that may be used in a vehicle suspension incorporating the principles of this disclosure.

Referring now to FIG. 3, an example of a pneumatic retractor 30 that may be used in a steerable vehicle suspension 12 incorporating the principles of this disclosure is representatively illustrated. However, other types of retractors may be used, within the scope of this disclosure.

The retractor 30 may also be used in place of the dampers 26 in the suspension 13 of FIG. 2. The retractor 30 may also be used in other suspensions incorporating the principles of this disclosure.

In the FIG. 3 example, the retractor 30 includes a pressure port 32, an inflatable body 34, and connectors 36 at opposite ends. For example, the connectors 36 can be used to connect one end of the retractor 30 to the tie rod arm 16 of the steering knuckle 14, and to connect the other end of the retractor 30 to the axle 24.

One significant feature of the retractor 30 is that the body 34 tends to shorten in response to an increase in pressure applied to an interior of the body 34. Thus, FIG. 3 depicts the body 34 in solid lines with no or negligible pressure within the body 34. The body 34 is depicted in broken lines to depict the result of increased pressure applied to the interior of the body 34.

With increased pressure applied to the interior of the body 34, the body tends to shorten, so that a tensile force T is exerted in the retractor 30. In some examples, the body 34 tends to shorten in response to increased internal pressure, due to a fabric mesh orientation of the body 34 that changes when the pressure increases (see FIGS. 6A & B). A suitable retractor of this type is marketed by Veyance Technologies, Inc. of Fairlawn, Ohio USA, although other retractors may be used in keeping with the principles of this disclosure.

The tensile force T output by the retractor 30 is related to the pressure applied to the pressure port 32. To regulate this pressure, and thereby control operation of the retractor 30, a control system 40 can be provided. The control system 40 may include a controllable pressure source 42 (such as, a compressor, an accumulator, etc.) which may be controlled by a controller 44.

The controller 44 can receive inputs 46 (such as, preprogrammed instructions, commands, data, etc.) to increase or decrease the pressure applied to the retractor 30. In response, the controller 44 controls an output pressure supplied by the controllable pressure source 42.

In one example described more fully below, one of the inputs 46 can be an indication that a forward speed of the vehicle 10 has increased from a lower speed first range to a higher speed second range. The inputs 46 could be received from a data bus of the vehicle 10 (such as, an industry standard controller area network (CAN) bus), indicating that a transmission of the vehicle 10 has been shifted into a higher or highest gear (e.g., upshifted to a lower gear ratio), or that the vehicle's positive speed has reached a preselected threshold level.

While the vehicle 10 speed is in the lower first speed range, a corresponding first pressure level may be applied to the retractors 30. This first pressure level can be sufficient to dampen rotation of the steering knuckles 14, while still allowing the steering knuckles 14 to rotate for steering at relatively low speeds.

Upon receiving an indication that the vehicle 10 is moving at or above the preselected threshold level (or that the transmission has been shifted into a higher or highest gear), the controller 44 can operate the pressure source 42 to increase pressure applied to the retractors 30 to a second pressure level. When sufficient pressure is applied to the retractors 30 in this situation, undesirable oscillations (also known as "shimmy") of the steering knuckles 14 can be mitigated or entirely prevented, while still allowing the steering knuckles 14 to rotate for steering.

In another example described more fully below, one of the inputs 46 can be an indication that the vehicle 10 is backing up. The inputs 46 could be received from a data bus of the vehicle 10, indicating that a transmission of the vehicle 10 has been shifted into reverse, or that the vehicle is actually backing up (e.g., negative vehicle speed detected).

Upon receiving an indication that the vehicle 10 is backing up, the controller 44 can operate the pressure source 42 to increase pressure applied to the retractors 30. When sufficient pressure is applied to the retractors 30, steering can be prevented, so that the steering knuckles 14 do not rotate when the vehicle 10 backs up. Note that this sufficient pressure to prevent rotation of the steering knuckles 14 while the vehicle is backing up will be greater than the first and second pressures discussed above for dampening rotation of the steering knuckles 14 while the vehicle 10 is moving forward.

Figure 4:
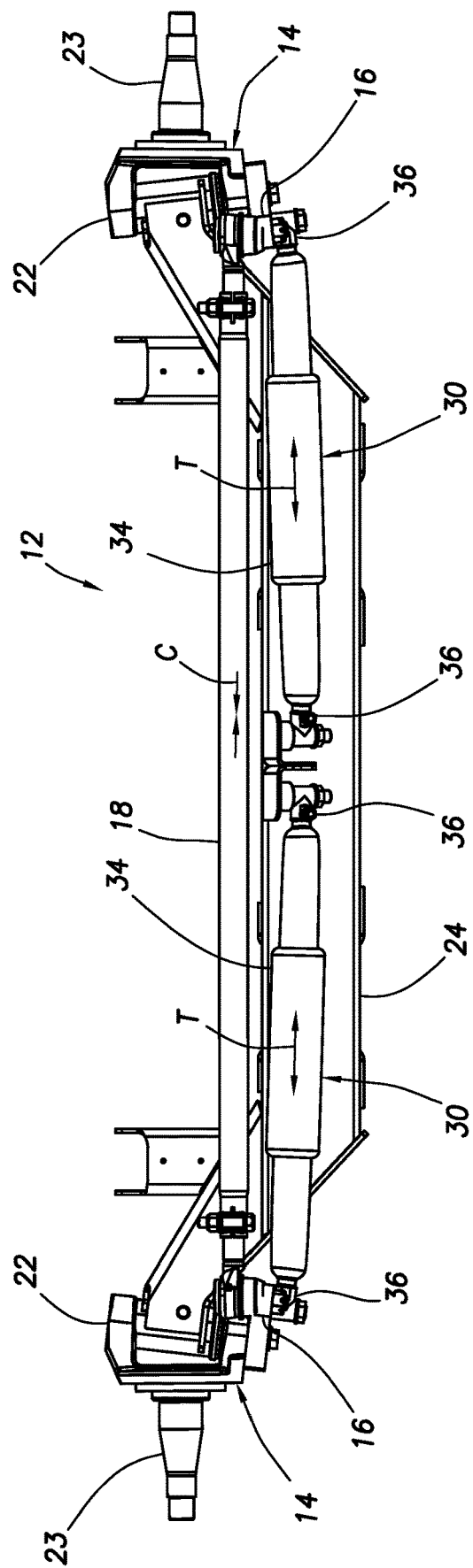
FIGS. 4 & 5 are representative elevational and bottom views of an example of the vehicle suspension including the retractor of FIG. 3.
Figure 5:
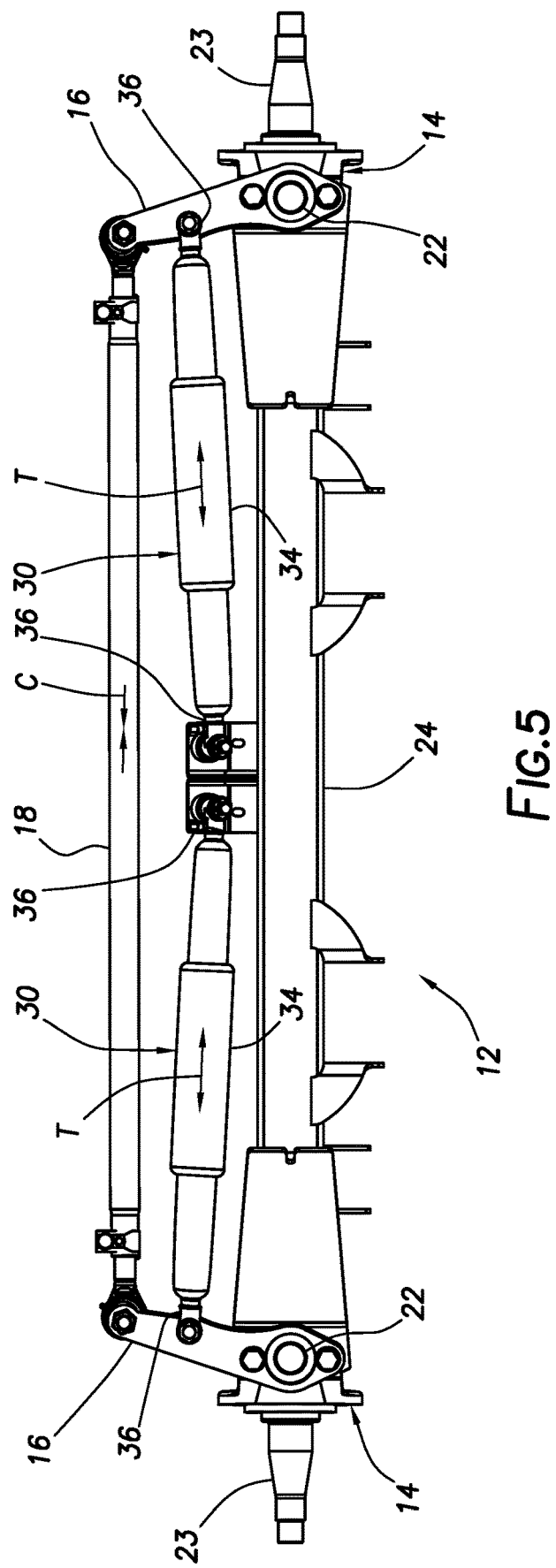

Referring additionally now to FIGS. 4 & 5, an example of a steerable vehicle suspension 12 embodying the principles of this disclosure is representatively illustrated in respective elevational and bottom views. The suspension 12 may be used with the vehicle 10 of FIG. 1, or it may be used with other vehicles.

Since the FIGS. 4 & 5 suspension 12 includes various components similar to those of the FIG. 2 suspension 13, those components are indicated in FIGS. 4 & 5 using the same reference numbers. However, it is not necessary in keeping with the scope of this disclosure for the suspension 12 to include any component similar to that of the suspension 13.

For clarity, various conventional components of the suspension 12 are not depicted in FIGS. 4 & 5. For example, components well known to those skilled in the art (such as, air springs, suspension arms or beams, lift mechanisms, brakes, shock absorbers, brackets, etc.), may be provided in various examples.

In the FIGS. 4 & 5 example, each of the retractors 30 is connected between the axle 24 and a respective one of the tie rod arms 16. When pressure is applied to one of the retractors 30, the retractor 30 applies the tensile force T to the respective tie rod arm 16, thereby biasing the corresponding steering knuckle 14 to rotate inward. A torque applied to the steering knuckle 14 by the retractor 30 via the tie rod arm 16 increases as the pressure increases, and the torque applied to the steering knuckle 14 by the retractor 30 via the tie rod arm 16 decreases as the pressure decreases.

Since the force T is applied in an inward direction to each of the tie rod arms 16, the opposite ends of the tie rod 18 are also biased inward, resulting in a compressive force C being applied to the tie rod 18. The compressive force C varies with changes in the pressure applied to the retractors 30, in a manner similar to that of the tensile force T varying with changes in the pressure applied to the retractors 30.

When the vehicle 10 is moving forward in a relatively low first speed range, a first pressure level can be applied to the retractors 30. This relatively low first pressure level will result in a corresponding relatively low inwardly directed stabilizing force T applied by the retractors 30 to the steering knuckles 14, a corresponding relatively low resistance to rotation of the steering knuckles 14, and a corresponding relatively low compressive force C in the tie rod 18.

When the vehicle 10 is moving forward in a relatively high second speed range (or the vehicle transmission is upshifted), a second pressure level can be applied to the retractors 30. This increased second pressure level will result in a corresponding increased inwardly directed stabilizing force T applied by the retractors 30 to the steering knuckles 14, a corresponding increased resistance to rotation of the steering knuckles 14, and a corresponding increased compressive force C in the tie rod 18.

When the vehicle 10 is backing up, a third pressure level can be applied to the retractors 30. This increased third pressure level will result in a corresponding increased inwardly directed force T applied by the retractors 30 to the steering knuckles 14, a corresponding prevention of rotation of the steering knuckles 14, and a corresponding increased compressive force C in the tie rod 18. A subsequent decrease in the pressure (such as, to the first or second pressure levels described above) will again permit rotation of the steering knuckles 14.

Note that it is not necessary for the first, second and third pressure levels to be applied in any particular order. For example, the third pressure level could be applied before either of the first and second pressure levels, the first pressure level could be applied after the second pressure level, etc.

In some examples, the pressure level applied to one of the retractors 30 may not be the same as the pressure level applied to the other retractor. In this manner, the vehicle suspension 12 may be steered (i.e., causing rotation of the steering knuckles 14, including the wheel spindles 23) by applying a greater pressure to one retractor 30 than to the other retractor 30. For example, the controller 44 could cause the pressure source 42 to apply unequal pressure levels to the retractors 30 in response to a predetermined input 46 (such as, rotation of a steering wheel of the vehicle 10, sensed steering of a front suspension of the vehicle, etc.). In this example, the suspension 12 could be steered, whether the vehicle 10 is moving forward or in reverse.

Figure 6A:
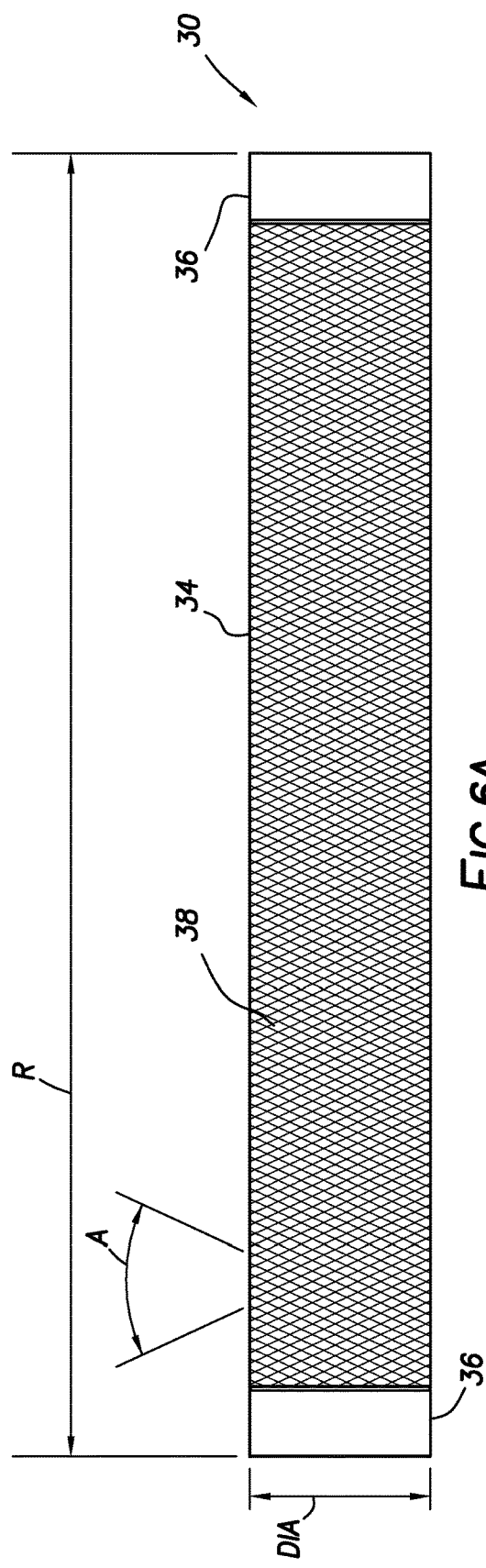
FIGS. 6A & B are representative side views of another example of the retractor in respective retracted and extended configurations.

Referring additionally now to FIGS. 6A & B, another example of the retractor 30 is representatively illustrated in respective retracted and extended configurations. The retractor 30 may be used in the suspension 12 described herein, or it may be used in other vehicle suspensions.

In the FIGS. 6A & B example, the retractor 30 includes a molded composite body 34 with connectors 36 at opposite ends of the body. Note that the connectors 36 in this example are not pivotable, but pivotable connectors could be provided (such as those depicted in FIG. 3), if desired.

Figure 6B:
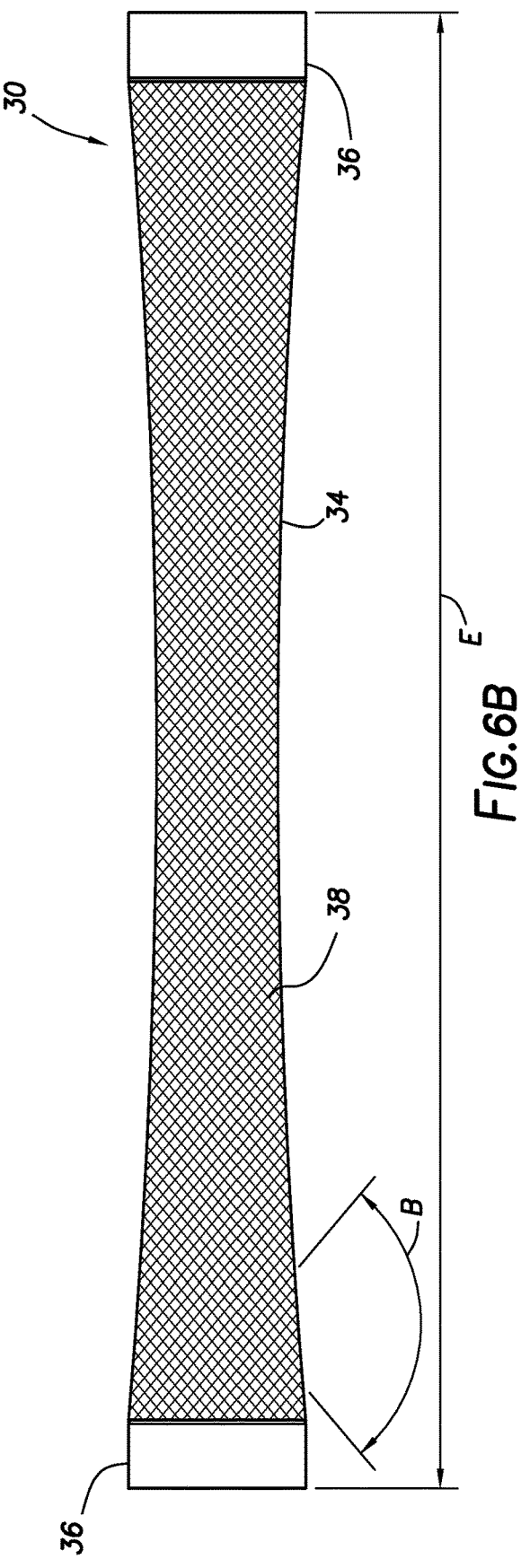

The body 34 includes a woven reinforcement 38, with a relative angle A between weaves in the retracted configuration of FIG. 6A. In the extended configuration, the relative angle B between weaves is increased, as depicted in FIG. 6B.

In FIG. 6A, the body 34 is in an as-molded condition, with the retractor 30 having an overall length R. When a tensile force is applied to the retractor 30, the body 34 elongates, as depicted in FIG. 6B, so that the retractor has an overall length E. Thus, with the retractor 30 connected between the axle 24 and one of the tie rod arms 16, the retractor 30 will elongate when the tie rod arm rotates outward, and the retractor will shorten when the tie rod arm rotates inward.

When used in a suspension such as the suspension of FIG. 5, this requirement of a tensile force to elongate the retractor 30 results in a self-centering effect, whereby the steering knuckles 14 (including the tie rod arms 16 and spindles 23) are biased toward "mirror-image" orientations relative to the axle 24, so that the tie rod 18 is centered. As with the other retractor examples described herein, the FIGS. 6A & B retractor 30 will tend to shorten or retract in response to increased pressure applied to an interior of the retractor body 34.

Note that the connectors 36 in the FIGS. 6A & B example are crimped onto the body 34 at its opposite ends. Preferably, the connectors 36 have an outer diameter DIA that is the same as, or similar to, a diameter of the body 34 in the retracted configuration.

Figure 7A:
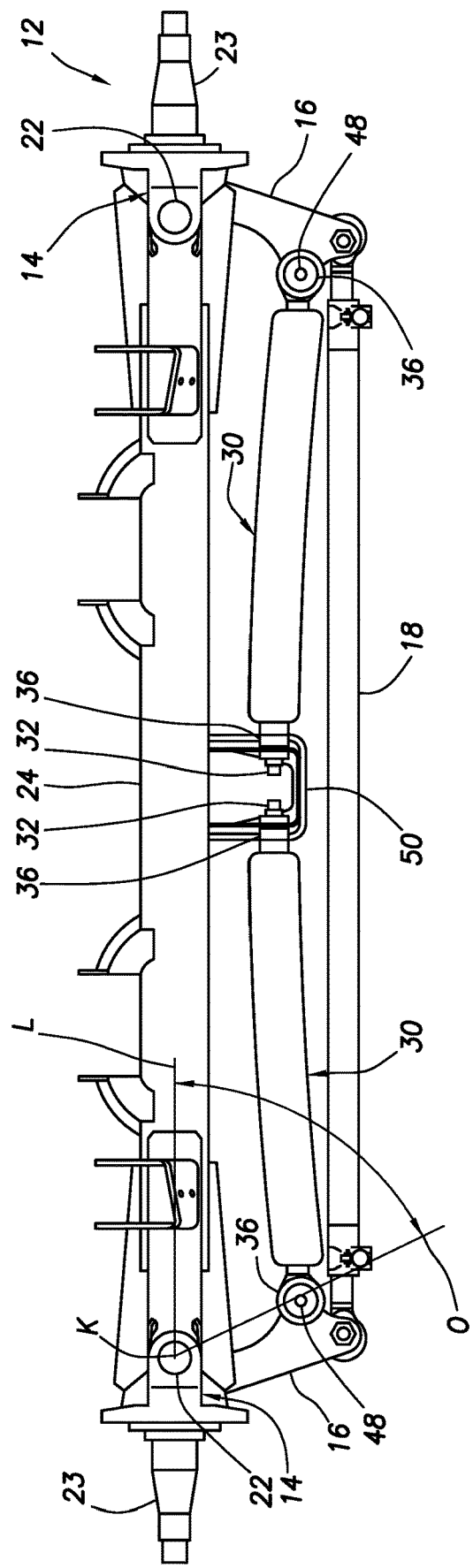
FIGS. 7A-C are representative top views of another example of the steerable vehicle suspension in centered and steered configurations.
Figure 7B:
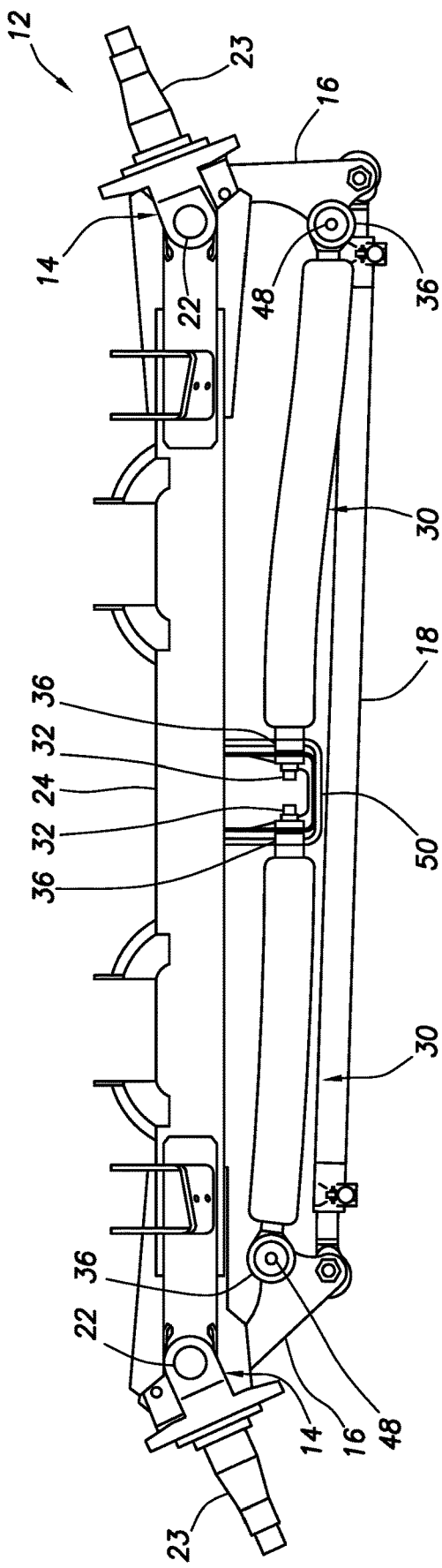
Figure 7C:
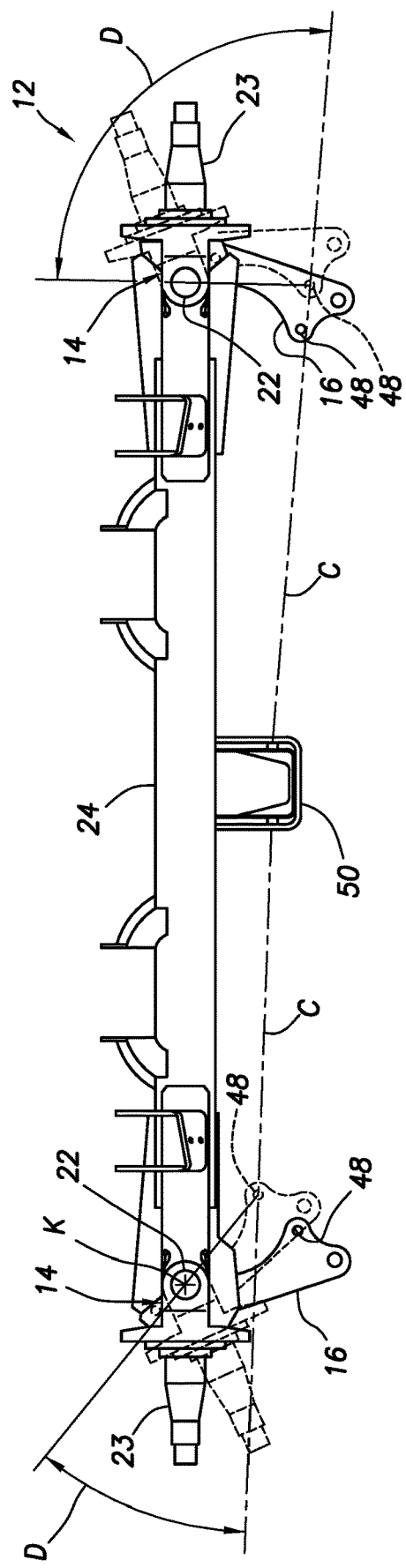

Referring additionally now to FIGS. 7A-C, another example of the vehicle suspension 12 is representatively illustrated. In this example, the retractors 30 are connected to the respective tie rod ends 16 at connection locations 48 that are angularly offset relative to the axle 24, so that the self-centering effect is enhanced.

As depicted in FIG. 7A, the tie rod 18 is centered and the steering knuckles 14 are in "mirror-image" orientations relative to each other. In this configuration, the suspension 12 is "centered" so that it will track straight, without steering to either lateral direction. The retractors 30 have equal lengths in this centered configuration.

The connection locations 48 are angularly offset relative to a longitudinal axis L of the axle 24 by an offset angle O (an included angle between the axle axis L, an axis of rotation K of the king pin 22, and the connection location 48). The offset angle O in this example is approximately 45 degrees. In other examples, the offset angle O could be in the range of 40-50 degrees, although other offset angles could be used if desired.

As depicted in FIG. 7B, the suspension 12 is not centered, and the steering knuckles 14 have been rotated relative to the axle 24, so that the suspension is being steered. Note that the retractor 30 being compressed (the retractor on the left as viewed in FIG. 7B) experiences a change in length that is less than a change in length experienced by the retractor being extended (the retractor on the right as viewed in FIG. 7B).

The reduced compression (i.e., shortening) of the compressed retractor 30 when the suspension 12 is being steered reduces the possibility of buckling the compressed retractor. In addition, the greater elongation of the retractor 30 being extended increases the tensile load exerted by the extended retractor, thereby biasing the suspension 12 toward its FIG. 7A centered configuration.

In FIG. 7C, the tie rod 18 and retractors 30 are not depicted for purposes of clarity, but longitudinal axes C of the retractors are illustrated. The steering knuckles 14 (including the wheel spindles 23 and the tie rod ends 16) are depicted in solid lines for the FIG. 7A centered configuration, and in dashed lines for the FIG. 7B steered configuration, so that a comparison between the configurations is apparent.

Note that, for the retractor 30 being compressed when the suspension 12 is steered (on the left as viewed in FIG. 7C), the connection location 48 displaces substantially toward the axle 24, whereas the connection location 48 for the retractor 30 being extended (on the right as viewed in FIG. 7C) displaces less toward the axle. As a result, the longitudinal axis C of the retractor 30 being compressed is more nearly parallel to the longitudinal axis L of the axle 24, and an outboard included angle D between the axis C, the connection location 48 and the kingpin axis K for the retractor being compressed is less than the outboard included angle D for the retractor being extended. This amplifies the self-centering effect, since a "torque arm" (or moment arm) for applying torque to the steering knuckle 14 via the tie rod arm 16 corresponding to the retractor 30 being extended is greater than a "torque arm" (or moment arm) for applying torque to the steering knuckle via the tie rod arm corresponding to the retractor being compressed.

In the FIGS. 7A-C example, the connections between the retractors 30 and the tie rod arms 16 are rotatable, so that the connectors 36 are pivotable relative to the tie rod arms. However, the connections between the retractors 30 and the axle 24 (for example, at a bracket 50 secured to the axle) are not rotatable. Thus, the retractors 30 bend somewhat as they are compressed or extended when the suspension 12 is steered.

One benefit of the non-rotating connections between the retractors 30 and the axle 24 is that the pressure ports 32 can be rigidly secured with the inboard connectors 36, thereby enhancing a reliability of the pressure transmission between the retractors and the control system 40 (see FIG. 3). Another benefit is that the construction of the pressure ports 32 is simplified (e.g., enabling the pressure ports to be integrated with the connectors 36).

Figure 8A:
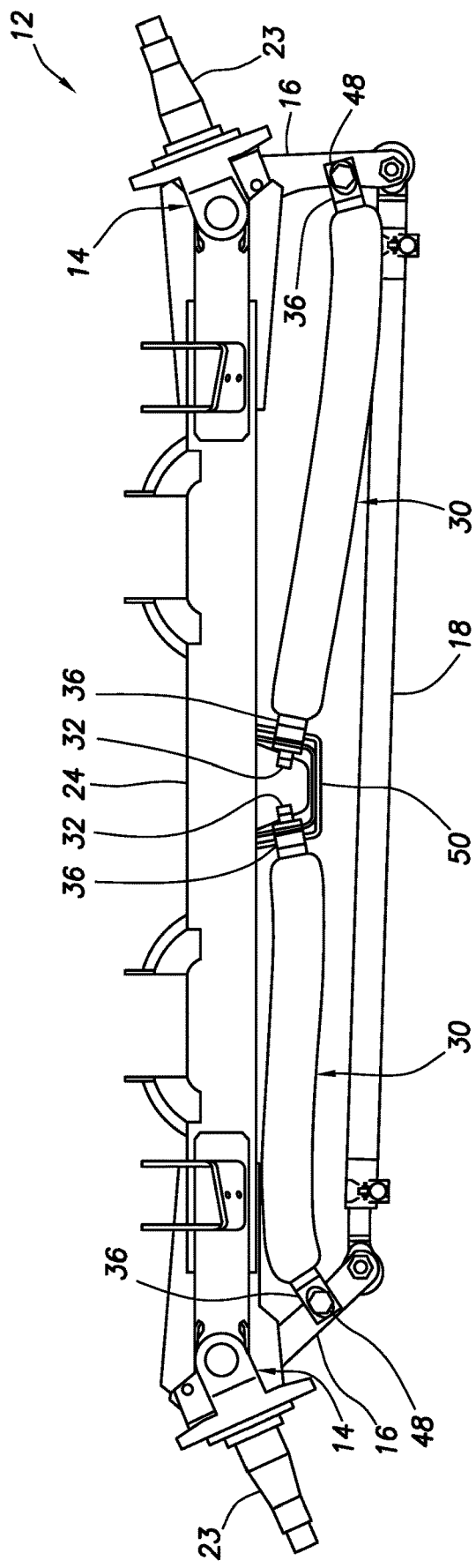
FIGS. 8A & B are representative top views of another example of the steerable vehicle suspension in centered and steered configurations.

Referring additionally now to FIGS. 8A & B, another example of the suspension 12 is representatively illustrated. In this example, the connectors 36 at both inboard and outboard ends of the retractors 30 are non-rotating.

In FIG. 8A, the suspension 12 is depicted in a steered configuration. Note that the retractors 30 as depicted in the steered configuration of FIG. 8A bend more as compared to the steered configuration of FIG. 7B.

In FIG. 8B, the tie rod 18 and the retractors 30 are not depicted for purposes of clarity. The steering knuckles 14 (including the wheel spindles 23 and the tie rod ends 16) are depicted in solid lines for the centered configuration, and in dashed lines for the FIG. 8A steered configuration, so that a comparison between the configurations is apparent.

Note that, when the suspension 12 transitions from the centered to the steered configuration, the connection location 48 for the retractor 30 being compressed (on the left as viewed in FIG. 8B) displaces toward the axle 24 a distance F, and displaces inboard a distance G. In comparison, the connection location 48 for the retractor 30 being extended (on the right as viewed in FIG. 8B) displaces a distance H relative to the axle 24, and displaces outboard a distance 1.

In this example, the distance F is substantially greater than the distance H, whereby the torque arm for applying torque by the retractor 30 being extended to its respective tie rod arm 16 is greater than the torque arm for applying torque by the retractor being compressed to its respective tie rod arm. The distance H in some examples could be zero, or negligible. As with the example of FIGS. 7A-C, the offset angle O in the FIGS. 8A & B example could be approximately 45 degrees, could be in the range of 40-50 degrees, or other offset angles could be used if desired.

Although in FIGS. 7B-8B the suspension 12 is depicted as being steered in one direction, it will be appreciated that the suspension can be steered in an opposite direction when desired. A configuration of the suspension 12 when steered in the opposite direction can be a "mirror image" of the suspension as depicted in the steered configuration of FIGS. 7B-8B, although in some examples the suspension may have a minimum turning radius when steered in one direction that is not equal to its minimum turning radius when steered in an opposite direction.

Figure 9:
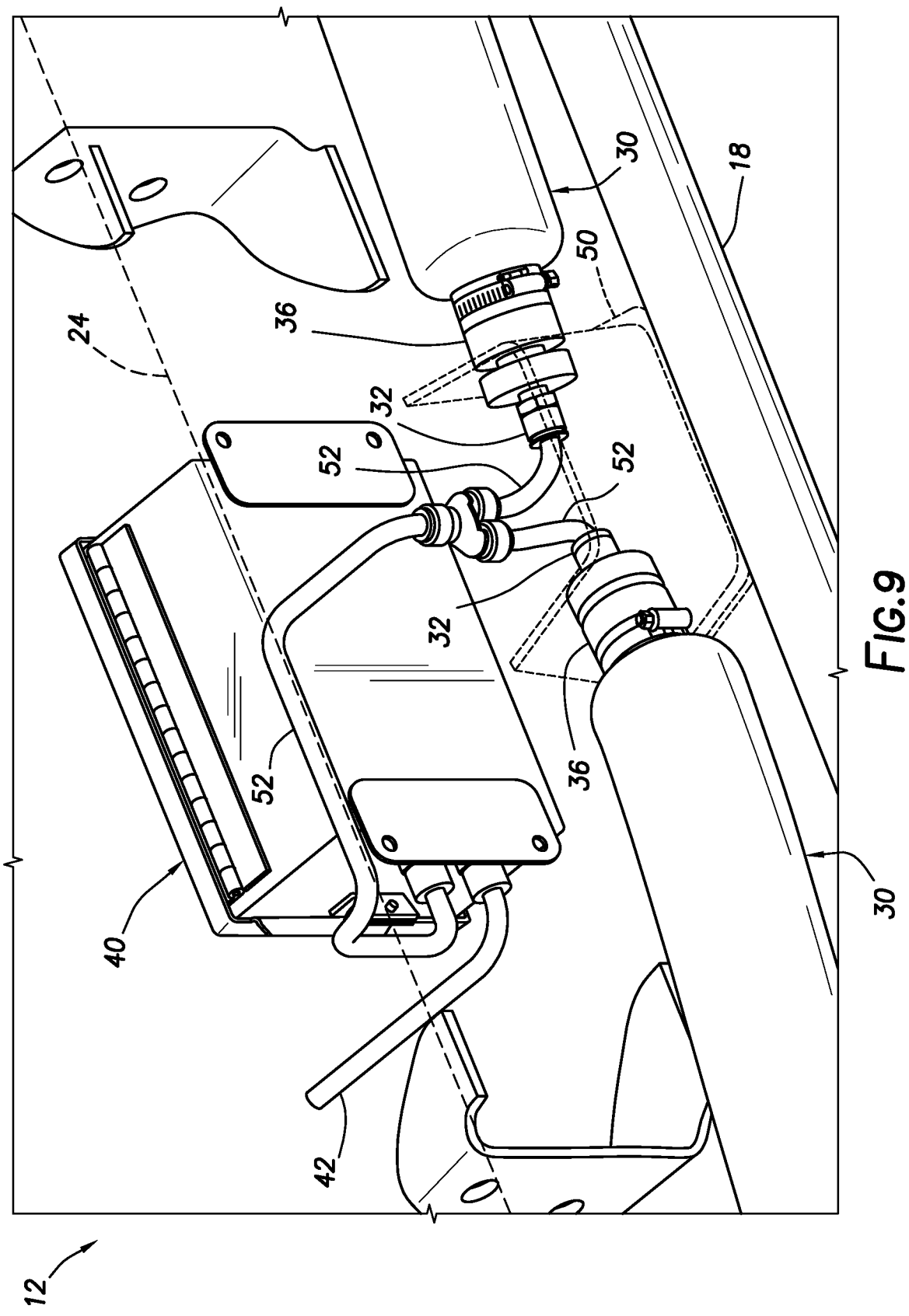
FIG. 9 is a representative perspective view of a portion of the FIGS. 8A & B example of the steerable vehicle suspension.

Referring additionally now to FIG. 9, a more detailed view of the connectors 36 for securing the retractors 30 relative to the axle 24 in the FIGS. 7A-8B examples is representatively illustrated. In this view, it may be seen that lines 52 for transmitting pneumatic pressure between the control system 40 and the retractors 30 can remain stationary while the suspension 12 transitions between centered and steered configurations (and while the retractors bend as they are compressed and extended). The connectors 36 do not rotate relative to the axle 24 or bracket 50 as the suspension 12 transitions between centered and steered configurations.

It may now be fully appreciated that the above disclosure provides significant benefits to the arts of constructing and operating steerable vehicle suspensions. In some examples described above, the retractors 30 do not have to operate under high compressive loads. Instead, compressive loads C are borne by the relatively robust and reliable tie rod 18.

The above disclosure provides to the arts a steerable vehicle suspension 12. In one example, the steerable vehicle suspension 12 can include an axle 24, at least one retractor 30 having a length that decreases in response to a pressure increase applied to the retractor 30, and at least one wheel spindle 23, in which resistance to rotation of the wheel spindle 23 relative to the axle 24 increases in response to the pressure increase applied to the retractor 30.

The retractor 30 may be connected between the axle 24 and a tie rod arm 16.

The steerable vehicle suspension 12 can also include a tie rod 18. A compressive force C in the tie rod 18 may increase in response to the pressure increase applied to the retractor 30.

The spindle 23 may rotate with a steering knuckle 14. A stabilizing force T applied to the steering knuckle 14 may increase in response to the pressure increase applied to the retractor 30.

Rotation of the wheel spindle 23 may be prevented in response to the pressure increase applied to the retractor 30. Rotation of the wheel spindle 23 may be permitted in response to a pressure decrease applied to the retractor 30.

A control system 40 may vary the pressure applied to the retractor 30. A first positive pressure may be applied to the retractor 30 in a first speed range, and a second positive pressure may be applied to the retractor 30 in a second speed range. The second positive pressure may be greater than the first positive pressure, and the second speed range may be greater (faster) than the first speed range.

A third positive pressure may be applied to the retractor 30 when the steerable vehicle suspension 12 is operated in reverse. The third positive pressure may be greater than each of the first and second positive pressures.

The "at least one" retractor 30 may comprise multiple retractors 30, and unequal pressure levels may be simultaneously applied to the respective retractors 30. The wheel spindle 23 may rotate in response to the unequal pressure levels applied to the respective retractors 30.

The "at least one" retractor may comprise first and second retractors 30. In a steered configuration of the suspension 12, the first retractor 30 may be compressed a first distance and the second retractor 30 may be extended a second distance relative to a centered configuration of the suspension 12. The second distance may be greater than the first distance. The second retractor 30 may be extended more than the first retractor 30 is compressed, in the steered configuration of the suspension 12.

In the steered configuration, a first connection location 48 between the first retractor 30 and a first tie rod arm 16 may be spaced apart from the axle 24 a first distance and a second connection location 48 between the second retractor 30 and a second tie rod arm 16 may be spaced apart from the axle 24 a second distance. The second distance may be greater than the first distance. A moment arm between the second retractor 30 and the second tie rod arm 16 may be greater than a moment arm between the first retractor 30 and the first tie rod arm 16 in the steered configuration.

Also provided to the arts by the above disclosure is a method of operating a steerable vehicle suspension 12 of a vehicle 10. In one example, the method includes allowing steering knuckles 14 rotatably mounted at opposite ends of an axle 24 to rotate relative to the axle 24 while the vehicle 10 moves forward; and applying an inwardly directed force T simultaneously to each of the steering knuckles 14.

The inwardly directed force T may increase in response to an increase in a pressure applied to at least one retractor 30.

The "at least one" retractor 30 may comprise multiple retractors 30, and the method may include applying unequal pressure levels simultaneously to the respective retractors 30. The method may further include rotating the steering knuckles 14 in response to the unequal pressure levels applying step.

The applying step may include producing a compressive force C in a tie rod 18 connecting the steering knuckles 14.

The applying step may include increasing a positive pressure applied to a retractor 30 in response to an increase in a positive speed of the vehicle 10.

The method may include preventing the steering knuckles 14 from rotating relative to the axle 24 by applying pressure to the retractor 30.

The applying step may include increasing a positive pressure applied to a retractor 30 prior to the vehicle 10 backing up.

A control system 40 may vary the inwardly directed force T in response to a change in positive speed, or in response to the vehicle 10 backing up.

The method may include connecting a retractor 30 between the axle 24 and one of the steering knuckles 14.

The step of allowing the steering knuckles 14 to rotate may include decreasing the inwardly directed force T.

Another steerable vehicle suspension 12 is described above. In this example, the suspension 12 can include two rotatably mounted steering knuckles 14, and two retractors 30 connected to the steering knuckles 14. An inwardly directed force T is applied by each retractor 30 to a respective one of the steering knuckles 14 in response to pressure applied to the retractors 30.

Each of the retractors 30 may be connected between an axle 24 and the respective one of the steering knuckles 14.

The steerable vehicle suspension 12 can include a tie rod 18. A compressive force C in the tie rod 18 may increase in response to the pressure applied to the retractors 30.

The inwardly directed force T applied to the steering knuckles 14 may increase in response to an increase in the pressure applied to the retractors 30.

Rotation of the steering knuckles 14 may be prevented in response to the pressure applied to the retractors 30. Rotation of the steering knuckles 14 may be permitted in response to a decrease in the pressure applied to the retractors 30.

A control system 40 may vary the pressure applied to the retractors 30, with a first positive pressure being applied to the retractors 30 in a first speed range, and a second positive pressure being applied to the retractors 30 in a second speed range. The second positive pressure may be greater than the first positive pressure, and the second speed range may be greater than the first speed range.

A third positive pressure may be applied to the retractors 30 when the steerable vehicle suspension 12 is operated in reverse. The third positive pressure may be greater than each of the first and second positive pressures.

Unequal pressure levels may be simultaneously applied to the respective retractors 30. The steering knuckles 14 may rotate in response to the unequal pressure levels applied to the respective retractors 30.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A steerable vehicle suspension, comprising:
   an axle;
   at least one retractor having a length that decreases in response to a pressure increase applied to the retractor from an external pressure source; and
   at least one wheel spindle,
   in which resistance to rotation of the wheel spindle relative to the axle increases in response to the pressure increase applied to the retractor.

2. The steerable vehicle suspension of claim 1, in which the retractor is connected between the axle and a tie rod arm.

3. The steerable vehicle suspension of claim 1, further comprising a tie rod, and in which a compressive force in the tie rod increases in response to the pressure increase applied to the retractor.

4. The steerable vehicle suspension of claim 1, in which the spindle rotates with a steering knuckle, and a stabilizing force applied to the steering knuckle increases in response to the pressure increase applied to the retractor.

5. The steerable vehicle suspension of claim 1, in which rotation of the wheel spindle is prevented in response to the pressure increase applied to the retractor.

6. The steerable vehicle suspension of claim 1, in which rotation of the wheel spindle is permitted in response to a pressure decrease applied to the retractor.

7. The steerable vehicle suspension of claim 1, in which a control system varies the pressure applied to the retractor, a first positive pressure being applied to the retractor in a first speed range, and a second positive pressure being applied to the retractor in a second speed range.

8. The steerable vehicle suspension of claim 7, in which the second positive pressure is greater than the first positive pressure, and in which the second speed range is greater than the first speed range.

9. The steerable vehicle suspension of claim 7, in which a third positive pressure is applied to the retractor when the steerable vehicle suspension is operated in reverse.

10. The steerable vehicle suspension of claim 9, in which the third positive pressure is greater than each of the first and second positive pressures.

11. The steerable vehicle suspension of claim 1, in which the at least one retractor comprises multiple retractors, and in which unequal pressure levels are simultaneously applied to the respective retractors.

12. The steerable vehicle suspension of claim 11, in which the wheel spindle rotates in response to the unequal pressure levels applied to the respective retractors.

13. The steerable vehicle suspension of claim 1, further comprising:
a king pin having an axis of rotation relative to the axle; and
a tie rod arm that rotates with the wheel spindle about the axis of rotation, the retractor being connected to the tie rod arm at a connection location, and
in which an included angle between the connection location, the axis of rotation and a longitudinal axis of the axle is in a range of 40-50 degrees.

14. The steerable vehicle suspension of claim 13, in which the included angle is approximately 45 degrees.

15. The steerable vehicle suspension of claim 1,
in which the at least one retractor comprises first and second retractors,
in which, in a steered configuration of the suspension, the first retractor is compressed a first distance and the second retractor is extended a second distance relative to a centered configuration of the suspension, and
in which the second distance is greater than the first distance.

16. The steerable vehicle suspension of claim 1,
in which the at least one retractor comprises first and second retractors, and
in which the second retractor is extended more than the first retractor is compressed, in a steered configuration of the suspension.

17. The steerable vehicle suspension of claim 1,
in which the at least one retractor comprises first and second retractors,
in which, in a steered configuration of the suspension, the first retractor is compressed and the second retractor is extended relative to a centered configuration of the suspension, a first connection location between the first retractor and a first tie rod arm is spaced apart from the axle a first distance and a second connection location between the second retractor and a second tie rod arm is spaced apart from the axle a second distance, and
in which the second distance is greater than the first distance.

18. The steerable vehicle suspension of claim 1,
in which the at least one retractor comprises first and second retractors, and
in which a first moment arm between the first retractor and a first tie rod arm is less than a second moment arm between the second retractor and a second tie rod arm, in a steered configuration of the suspension.

19. A steerable vehicle suspension, comprising:
two rotatably mounted steering knuckles; and
two retractors, each of the retractors being connected to a respective one of the steering knuckles,
in which an inwardly directed force is applied by each of the retractors to the respective one of the steering knuckles in response to pressure applied to each of the retractors.

20. The steerable vehicle suspension of claim 19, in which each of the retractors is connected between an axle and the respective one of the steering knuckles.

21. The steerable vehicle suspension of claim 19, further comprising a tie rod, and in which a compressive force in the tie rod increases in response to the pressure applied to the retractors.

22. The steerable vehicle suspension of claim 19, in which the inwardly directed force applied to the steering knuckles increases in response to an increase in the pressure applied to the retractors.

23. The steerable vehicle suspension of claim 19, in which rotation of the steering knuckles is prevented in response to the pressure applied to the retractors.

24. The steerable vehicle suspension of claim 19, in which rotation of the steering knuckles is permitted in response to a decrease in the pressure applied to the retractors.

25. The steerable vehicle suspension of claim 19, in which a control system varies the pressure applied to the retractors, a first positive pressure being applied to the retractors in a first speed range, and a second positive pressure being applied to the retractors in a second speed range.

26. The steerable vehicle suspension of claim 25, in which the second positive pressure is greater than the first positive pressure, and in which the second speed range is greater than the first speed range.

27. The steerable vehicle suspension of claim 25, in which a third positive pressure is applied to the retractors when the steerable vehicle suspension is operated in reverse.

28. The steerable vehicle suspension of claim 27, in which the third positive pressure is greater than each of the first and second positive pressures.

29. The steerable vehicle suspension of claim 19, in which unequal pressure levels are simultaneously applied to the respective retractors.

30. The steerable vehicle suspension of claim 19, in which the steering knuckles rotate in response to the unequal pressure levels applied to the respective retractors.

31. The steerable vehicle suspension of claim 19,
in which, in a steered configuration of the suspension, one of the retractors is compressed a first distance and the other of the retractors is extended a second distance relative to a centered configuration of the suspension, and
in which the second distance is greater than the first distance.

32. The steerable vehicle suspension of claim 19,
in which the two retractors comprise first and second retractors, and
in which the second retractor is extended more than the first retractor is compressed, in a steered configuration of the suspension.

33. The steerable vehicle suspension of claim 19,
in which, in a steered configuration of the suspension, a first one of the retractors is compressed and a second one of the retractors is extended relative to a centered configuration of the suspension, a first connection location between the first retractor and a first tie rod arm is spaced apart from the axle a first distance and a second connection location between the second retractor and a second tie rod arm is spaced apart from the axle a second distance, and in which the second distance is greater than the first distance.

34. The steerable vehicle suspension of claim 19,
in which the two retractors comprise first and second retractors, and
in which a first moment arm between the first retractor and a first tie rod arm is less than a second moment arm between the second retractor and a second tie rod arm, in a steered configuration of the suspension.

35. A steerable vehicle suspension, comprising:
two rotatably mounted steering knuckles; and
two retractors, each of the retractors being connected to a respective one of the steering knuckles, each retractor including a body having an initial as-molded length and an installed length when connected to the respective steering knuckle, and the installed length of each retractor is greater than the as-molded length when the respective steering knuckle rotates outward.

36. The steerable vehicle suspension of claim 35, further comprising a tie rod connected to each of the steering knuckles, the tie rod having a centered position, and in which the installed length of each of the retractors is greater than the as-molded length when the tie rod is at the centered position.

37. The steerable vehicle suspension of claim 35, further comprising a tie rod connected to each of the steering knuckles, the tie rod having a centered position, and in which each of the retractors is in tension when the tie rod is at the centered position.

38. The steerable vehicle suspension of claim 35,
in which, in a steered configuration of the suspension, one of the retractors is compressed a first distance and the other of the retractors is extended a second distance relative to a centered configuration of the suspension, and
in which the second distance is greater than the first distance.

39. The steerable vehicle suspension of claim 35,
in which the two retractors comprise first and second retractors, and
in which the second retractor is extended more than the first retractor is compressed, in a steered configuration of the suspension.

40. The steerable vehicle suspension of claim 35,
in which, in a steered configuration of the suspension, a first one of the retractors is compressed and a second one of the retractors is extended relative to a centered configuration of the suspension, a first connection location between the first retractor and a first tie rod arm is spaced apart from the axle a first distance and a second connection location between the second retractor and a second tie rod arm is spaced apart from the axle a second distance, and
in which the second distance is greater than the first distance.

41. The steerable vehicle suspension of claim 35,
in which the two retractors comprise first and second retractors, and
in which a first moment arm between the first retractor and a first tie rod arm is less than a second moment arm between the second retractor and a second tie rod arm, in a steered configuration of the suspension.

42. The steerable vehicle suspension of claim 35, in which each of the retractors is connected between an axle and the respective one of the steering knuckles.

43. The steerable vehicle suspension of claim 35, in which an inwardly directed force is applied by each of the retractors to the respective one of the steering knuckles in response to pressure applied to each of the retractors.

44. The steerable vehicle suspension of claim 43, further comprising a tie rod, and in which a compressive force in the tie rod increases in response to the pressure applied to the retractors.

45. The steerable vehicle suspension of claim 43, in which the inwardly directed force applied to the steering knuckles increases in response to an increase in the pressure applied to the retractors.

46. The steerable vehicle suspension of claim 43, in which rotation of the steering knuckles is prevented in response to the pressure applied to the retractors.

47. The steerable vehicle suspension of claim 43, in which rotation of the steering knuckles is permitted in response to a decrease in the pressure applied to the retractors.

48. The steerable vehicle suspension of claim 43, in which a control system varies the pressure applied to the retractors, a first positive pressure being applied to the retractors in a first speed range, and a second positive pressure being applied to the retractors in a second speed range.

49. The steerable vehicle suspension of claim 48, in which the second positive pressure is greater than the first positive pressure, and in which the second speed range is greater than the first speed range.

50. The steerable vehicle suspension of claim 48, in which a third positive pressure is applied to the retractors when the steerable vehicle suspension is operated in reverse.

51. The steerable vehicle suspension of claim 50, in which the third positive pressure is greater than each of the first and second positive pressures.

52. The steerable vehicle suspension of claim 43, in which unequal pressure levels are simultaneously applied to the respective retractors.

53. The steerable vehicle suspension of claim 43, in which the steering knuckles rotate in response to the unequal pressure levels applied to the respective retractors.

54. The steerable vehicle suspension of claim 35, in which the installed length of one of the retractors is greater than the as-molded length when the steering knuckles are rotated away from a centered position.

55. The steerable vehicle suspension of claim 54, in which an increase in the installed length of the one of the retractors when the steering knuckles are rotated away from the centered position produces a force that biases the steering knuckles toward the centered position.

* * * * *